(12) United States Patent
Yoshida

(10) Patent No.: US 6,883,868 B2
(45) Date of Patent: Apr. 26, 2005

(54) TIP-UP AUTOMOTIVE SEAT PROVIDED WITH INTERLOCKING MEANS

(75) Inventor: Masami Yoshida, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 10/781,604

(22) Filed: Feb. 18, 2004

(65) Prior Publication Data

US 2005/0006940 A1 Jan. 13, 2005

(30) Foreign Application Priority Data

Feb. 19, 2003 (JP) ........................................ 2003-041836

(51) Int. Cl.⁷ ................................................ B60N 2/12
(52) U.S. Cl. .................... 297/331; 297/335; 297/344.1; 297/340; 296/65.13
(58) Field of Search ................................ 297/331, 335, 297/340, 344.1; 296/65.05, 65.13, 65.14

(56) References Cited

U.S. PATENT DOCUMENTS

| | | | | |
|---|---|---|---|---|
| 5,158,338 A | * | 10/1992 | Hayakawa et al. | 297/335 |
| 5,529,378 A | * | 6/1996 | Chaban et al. | 297/331 |
| 5,800,015 A | * | 9/1998 | Tsuchiya et al. | 297/331 |
| 6,059,345 A | * | 5/2000 | Yokota | 296/65.14 |
| 6,183,033 B1 | * | 2/2001 | Arai et al. | 296/65.09 |

FOREIGN PATENT DOCUMENTS

JP 9188170 7/1997

* cited by examiner

*Primary Examiner*—Anthony D Barfield
(74) *Attorney, Agent, or Firm*—Dann, Dorfman, Herrell and Skillman, P.C.

(57) ABSTRACT

A tip-up, slidable automotive seat comprises a seat cushion, a seat back, a tipping-up mechanism for allowing the seat cushion to be tipped up relative to the seat back, and an interlocking mechanism for preventing the seat from being moved forward unless the seat cushion is tipped up relative to the seat back and for allowing the seat to be moved forward when the seat cushion is tipped up.

2 Claims, 6 Drawing Sheets

US 6,883,868 B2

TIP-UP AUTOMOTIVE SEAT PROVIDED WITH INTERLOCKING MEANS

FIELD OF THE INVENTION

This invention relates to a tip-up, slidable automotive seat which is provided with interlocking means for preventing the seat from being moved forward unless a seat cushion of the seat is tipped up and for allowing the seat to be moved forward when the seat cushion of the seat is tipped up.

DESCRIPTION OF THE RELATED ART

There has been proposed a wagon car or the like which has front seats, first rear seats arranged behind the front seats, and second rear seats arranged behind the first rear seats. The first and second rear seats are adapted to be moved toward the front seats through seat track mechanisms. In order to obtain a passenger walk-in space and a space for burdens, seat cushions of the first and second rear seats are tipped up relative to seat backs of the first and second rear seats which are in standing-up conditions, and the first and second rear seats in which the seat cushions are in the tipped-up conditions are moved toward positions immediately behind the front seats (Japanese patent application laid open under Provisional Publication No. Hei. 9-188170).

Each of the first and second rear seats is provided with tipping-up means for allowing the seat cushion to be tipped up relative to the seat back which is in a standing-up condition, and interlocking means for preventing the seat from being moved forward unless the seat cushion is tipped up and for allowing the seat to be moved forward when the seat cushion is tipped up.

However, in the conventional seat, the interlocking means and the tipping-up means are complexly combined with each other, so that an assembly comprising the interlocking means and the tipping-up means is complicated.

The tipping-up means may be operated by an operating lever or may be automatically operated by an electrically powered motor. The interlocking means is preferably constructed as simple means that is constructed independently from the tipping-up means.

SUMMARY OF THE INVENTION

It is therefore an object of the present invention to provide a tip-up automotive seat which is provided with interlocking means, the structure of which is simplified.

It is another object of the present invention to provide a tip-up automotive seat which is provided with interlocking means that can resist a load of a seat cushion being tipped up relative to a seat back.

In accordance with the present invention, there is provided a tip-up automotive seat. The seat comprises a seat cushion, a seat back, seat track means for allowing the seat to be moved forward and rearward in a vehicle, the seat track means including a pair of substantially parallel stationary rails attached to a floor section of the vehicle, and a pair of substantially parallel movable rails slidably supported to the stationary rails, the movable rails having side brackets rising up therefrom, the seat back being arranged between the side brackets and supported to the side brackets, the seat cushion being arranged between the side brackets and pivotally supported to the side brackets, tipping-up means provided at one side or both sides of the seat for allowing the seat cushion to be tipped up relative to the seat back, the tipping-up means comprising a first rod and a straightly extending elongated hole formed in a corresponding side bracket, the first rod having a first end portion and a second end portion, the first end portion of the first rod being connected to a corresponding side of the seat cushion, the second end portion of the first rod being provided with an inducting pin, the inducting pin of the first rod being inserted in the straightly extending elongated hole so as to be moved along the elongated hole, and interlocking means provided at the one side or both sides of the seat for preventing the seat from being moved forward unless the seat cushion is tipped up relative to the seat back and for allowing the seat to be moved forward when the seat cushion is tipped up. The interlocking means comprises a restricting lever of a substantially inverted L-shape pivotally supported to a side of a corresponding movable rail, the restricting lever having a first arm portion extending toward a bottom portion of a corresponding stationary rail, and a second arm portion extending rearward from an upper region of the first arm portion, first spring means stretched between the side of the movable rail and the restricting lever, a second operating rod having a third end portion and a fourth end portion, a second operating rod including a support pin provided at the third end portion thereof and a stopper pin provided at the fourth end portion thereof, vertically spaced apart upper and lower guide holes of substantially L-shapes formed in the side bracket and disposed at portions of the side bracket which are lower than a portion of the side bracket in which the elongated hole is formed, the upper guide hole having a first hole portion extending substantially horizontally, and a second hole portion extending obliquely and upward from the second hole portion, the lower guide hole having a third hole portion extending substantially horizontally along an upper region of the second arm portion of the restricting lever, and a fourth hole portion extending obliquely and upward from the third hole portion, the support pin of the second operating rod being inserted in the upper guide hole so as to be moved along the upper guide hole, the stopper pin of the second operating rod being inserted in the lower guide hole so as to be moved along the lower guide hole, second spring means stretched between the side bracket and the operating rod, cam means disposed substantially between the elongated hole and the upper guide hole and pivotally supported to the side bracket, the cam means comprising a cam body, an upper receiving recess portion formed in the cam body for receiving the inducting pin of the first rod, and a lower receiving recess portion formed in the cam body for receiving the support pin of the second operating rod, and a stopper plate mounted on the bottom portion of the stationary rail. Unless the seat cushion is tipped up, the stopper pin of the second operating rod holds the second arm portion of the restricting lever and the first arm portion of the restricting lever is to be abutted against the stopper plate, so that the seat can not be moved forward. When the seat cushion is tipped up, the first rod is pulled upward while allowing the inducting pin of the first rod to be moved along the elongated hole, the inducting pin is operatively engaged with the upper receiving recess portion of the cam while causing the cam to be rotated, the second operating rod is moved upward while allowing the support pin and the stopper pin to be moved along the upper guide hole and the lower guide hole, respectively, whereby the restricting lever is allowed to be rotated due to an action of the first spring means and the restricting lever is brought to a condition where it is not to be abutted against the stopper plate.

The cam means may further include a semi-ring like guide member for guiding the support pin of the second operating rod along the upper guide hole, the semi-ring like guide member hanging downward from the cam body, the support pin of the second operating rod passing a space surrounded by the cam body and the semi-ring like guide member and being inserted in the upper guide hole.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENT

A tip-up automotive seat provided with interlocking means according to an embodiment of the present invention will be discussed hereinafter with reference to the accompanying drawings. In the illustrated example, the present invention is applied to a rear seat which is provided with tipping-up means for allowing a seat cushion of the rear seat to be tipped up relative to a seat back of the rear seat which is in a standing-up condition. The rear seat is adapted to be movable toward a position immediately behind a front seat through a seat track mechanism in order that a space for burdens and a passenger walk-in space can be obtained. The tipping-up means may be constructed so as to be manually actuated, may be constructed so as to be actuated by an operating lever, or may be constructed so as to be actuated by an electrically powered motor. The tipping-up means may be provided at both sides of the rear seat or may be provided at only one of the both sides of the rear seat. In the illustrated example, the tipping-up means are provided at the both sides of the rear seat.

Figure 1:
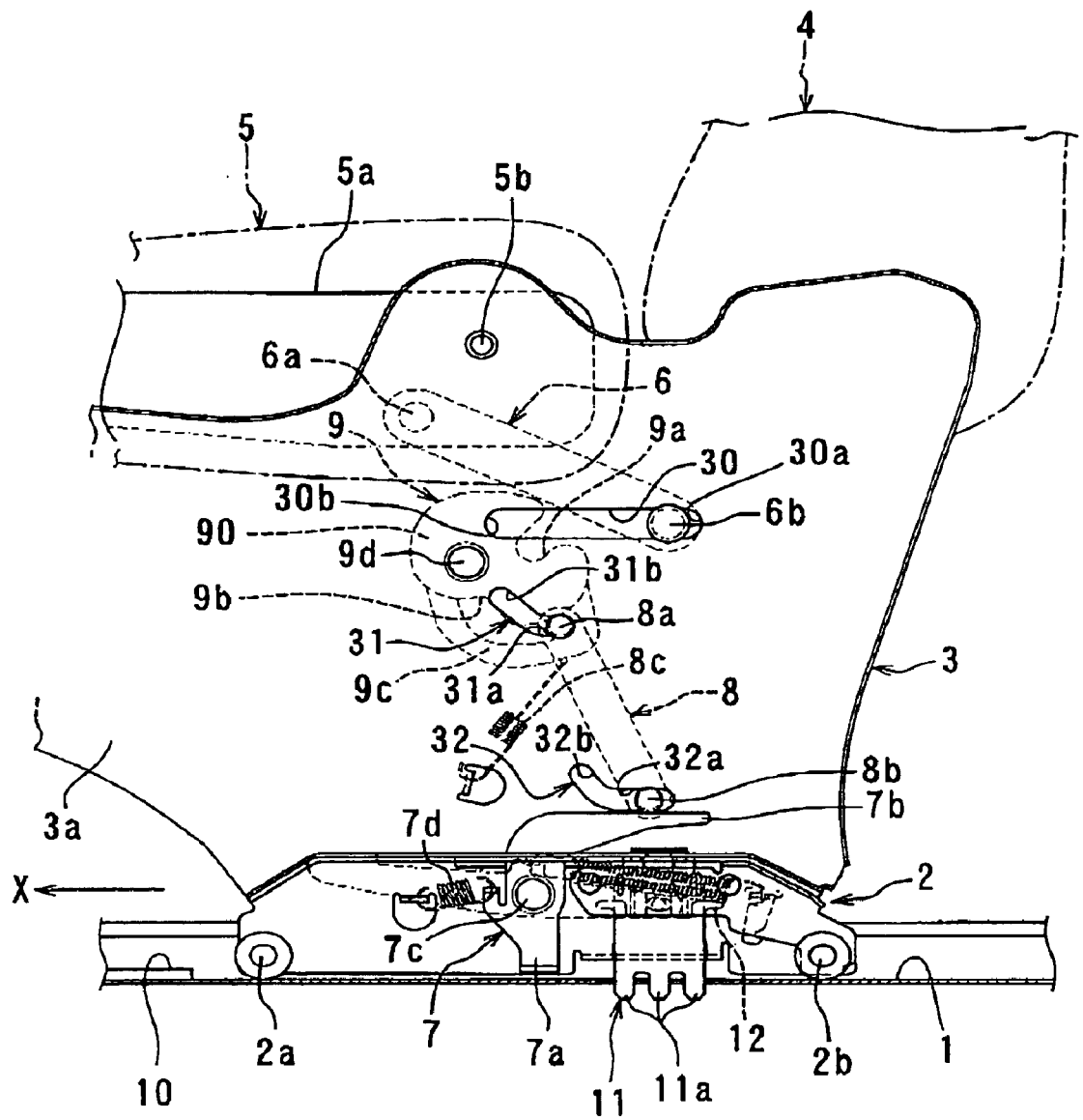
FIG. 1 is a schematic side view of a tip-up automotive seat provided with interlocking means according to an embodiment of the present invention.

Referring to FIG. 1, there is illustrated the rear seat according to the embodiment of the present invention. The rear seat is provided with a seat track mechanism for allowing the rear seat to be moved or slid to a position immediately behind a front seat (not shown) or rearward. The seat track mechanism comprises a pair of substantially parallel stationary rails 1 (only one stationary rail 1 is shown in FIG. 1) attached to a floor section of a vehicle, and a pair of substantially parallel movable rails 2 (only one movable rail 2 is illustrated in FIG. 1) slidably supported to the stationary rails 1. A pair of side brackets 3 (only one side bracket 3 is shown in FIG. 1) rise up from the movable rails 2. A seat back 4 of the rear seat is arranged between the side brackets 3 and supported to the side brackets 3 through any suitable conventional recliner devices (not shown) for causing the seat back 4 to be reclined relative to a seat cushion 5. The seat cushion 5 of the rear seat is arranged between the side brackets 3 and pivotally supported to the side brackets 3 through support shafts 5b (only one support shaft 5b is shown in FIG. 1). When the movable rails 2 are slid along the stationary rails 1, the rear seat can be moved toward the position immediately behind the front seat, or in such a direction as to be indicated by an arrow X in FIG. 1, and can be moved rearward.

The seat cushion 5 includes a frame 5a that is pivotally supported to the side brackets 3 by the support shafts 5b. The side brackets 3 has under frame sections 3a (only one under frame section 3a is shown in FIG. 1) projecting forward from the side brackets 3 for receiving the seat cushion 5 and keeping the seat cushion in a condition where a passenger can sit on the seat cushion 5.

The tipping-up mechanisms for allowing the seat cushion 5 to be tipped up relative to the seat back 4 are provided between the seat cushion 5 and the side brackets 3. Each of the tipping-up mechanisms includes a rod 6 and a straightly extending elongated hole 30 formed in a corresponding side bracket 3. The straightly extending elongated hole 30 has a first end 30a and a second end 30b. The rod 6 has a first end portion and a second end portion. The first end portion of the rod 6 is connected through a support pin 6a to a lower portion of the frame 5a of the seat cushion 5 which is away from a portion of the frame 5a of the seat cushion 5 which is supported to the corresponding side bracket 3 by the support shaft 5b. The second end portion of the rod 6 is provided with an inducting pin 6b which extends perpendicular to the rod 6 and is inserted in the elongated hole 30 of the side bracket 3 so as to be slidable along the elongated hole 30 of the side bracket 3. Sliding of the inducting pin 6b toward the second end 30b of the elongated hole 30 allows the seat cushion 5 to be tipped up.

The rear seat according to the embodiment of the present invention further includes interlocking means for preventing the rear seat from being moved forward unless the seat cushion 5 is tipped up relative to the seat back 4 and for allowing the rear seat to be moved forward when the seat cushion 5 is tipped up. The interlocking means may be provided at both sides of the rear seat or may be provided at only one of the both sides of the rear seat. In the illustrated embodiment, the interlocking mechanisms are provided at the both sides of the rear seat. Each of the interlocking mechanisms includes a restricting lever 7 of a substantially inverted L-shape pivotally supported to a side of a corresponding movable rail 2 by a support pin 7c. The restricting lever 7 includes a first arm portion 7a which extends toward a bottom portion of a corresponding stationary rail 1, and a second arm portion 7b which extends rearward and horizontally from an upper region of the first arm portion 7a. The restricting lever 7 is pivotally supported through the support pin 7c to the corresponding movable rail 2 at a region of the first arm portion 7a thereof which is adjacent the second arm portion 7b. A coil spring 7d which acts as a return spring is stretched between the restricting lever 7 and the side of the corresponding movable rail 2, whereby the restricting lever 7 is always urged so as to be swung around the support pin 7c in a counterclockwise direction in FIG. 1.

Each of the interlocking mechanisms further includes an operating rod 8, and a pair of vertically spaced apart upper and lower guide holes 31, 32 formed in the corresponding side bracket 3. The operating rod 8 has first and second end portions. The first end portion of the operating rod 8 is provided with a support pin 8a which extends perpendicular to the operating rod 8 and is inserted in the upper guide hole 31. The second end portion of the operating rod 8 is provided with a stopper pin 8b which extends perpendicular to the operating rod 8 and is inserted in the lower guide hole 32.

The upper guide hole 31 in which the support pin 8a of the operating rod 8 is inserted is formed in a portion of the corresponding side bracket 3 which is lower than a portion of the side bracket 3 in which the elongated hole 30 receiving the inducting pin 6b of the rod 6 is formed. The upper guide hole 31 is formed into a substantially L-shape, and comprises a first hole portion 31a substantially horizontally extending and a second hole portion 31b which extends upwardly and obliquely from the first hole portion 31a. The lower guide hole 32 in which the stopper pin 8b of the operating rod 8 is inserted is also formed into a substantially L-shape, and comprises a third hole portion 32a substantially horizontally extending along an upper region of the second arm portion 7b of the restricting lever 7, and a fourth hole portion 32b extending upwardly and obliquely from the third hole portion 32a. Stretched between the operating rod 8 and the side bracket 3 is a return spring 8c which always urges the operating rod 8 so as to cause the support pin 8a and the stopper pin 8b to be pushed toward an end of the first hole portion 31a of the upper guide hole 31 and an end of the third hole portion 32a of the lower guide hole 32, respectively.

Each of the interlocking mechanisms further includes a cam 9. The cam 9 comprises a cam body 90 disposed substantially between the elongated hole 30 and the upper guide hole 31 and pivotally supported through a support pin 9d to the corresponding side bracket 3, and a substantially semi-ring like guide member 9c hanging down from the cam body 90. The cam body 90 is formed with an upper receiving recess portion 9a for receiving the inducting pin 6b of the rod 6 which is received in the elongated hole 30, and a lower receiving recess portion 9b for receiving the support pin 8a of the operating rod 8 which is received in the upper guide hole 31. The semi-ring like guide member 9c surrounds the lower receiving recess portion 9b. The support pin 8a of the operating rod 8 passes a space surrounded by the cam body 90 and the semi-ring like guide member 9c and extends into the upper guide hole 31. When the cam 9 is rotated in a counterclockwise direction in FIG. 1 as will be discussed in greater detail hereinafter, the support pin 8a of the operating rod 8 is guided toward the second hole portion 31b of the upper guide hole 31 by semi-ring like guide member 9c, whereby the operating rod 8 is pulled upward while causing the stopper pin 8b to be moved toward the fourth hole portion 32b of the lower guide hole 32. The cam 9 may be formed as a one piece member comprising the cam body 90 and the semi-ring like guide member 9c or may comprise the cam body 90 and the semi-ring like guide member 9c which is formed independently from the cam body 90 and attached to the cam body 90.

An angle between the first and second hole portions 31a, 31b of the substantially L-shaped upper guide hole 31 is more obtuse than an angle between the third and fourth hole portions 32a, 32b of the substantially L-shaped lower guide hole 32, so that when the support pin 8a of the operating rod 8 is moved toward an end of the second hole portion 31b of the upper guide hole 32 and operatively engaged with the lower receiving recess portion 9b of the cam body 90, the support pin 8a of the operating rod 8 can be supported by a lower edge region of the second hole portion 31b of the upper guide hole 31. The fourth hole portion 32b of the lower guide hole 32 is slanted upward from the third hole portion 32a of the lower guide hole 32, so that when the stopper pin 8b of the operating rod 8 is moved toward the fourth hole portion 32b of the lower guide hole 32, the restricting lever 7 is rotated by an action of the coil spring 7d.

A stopper plate 10 is disposed within the corresponding stationary rail 1 and mounted on a bottom surface of the corresponding stationary rail 1. In a state where the seat cushion 5 is not tipped up, the first arm portion 7a of the restricting lever 7 is to be abutted against the stopper plate 10. In FIG. 1, reference numerals 2a, 2b denote rollers for facilitating the sliding of the movable rails 2 along the stationary rails 1, and a reference numeral 11 designates locking means for locking the movable rails 2 with respect to the stationary rails 1. The locking means 11 comprises engaging teeth 11a and is adapted to be operated by an operating lever (not shown) coupled to the locking means 11. The stationary rails 1 are formed with engaging holes (not shown). The locking means 11 is always urged by a return spring 12 in such a manner that the engaging teeth 11a of the locking means 11 are engaged with the engaging holes. The engaging teeth 11a of the locking means 11 are adapted to be disengaged from the engaging holes by operating the operating lever.

Figure 2:
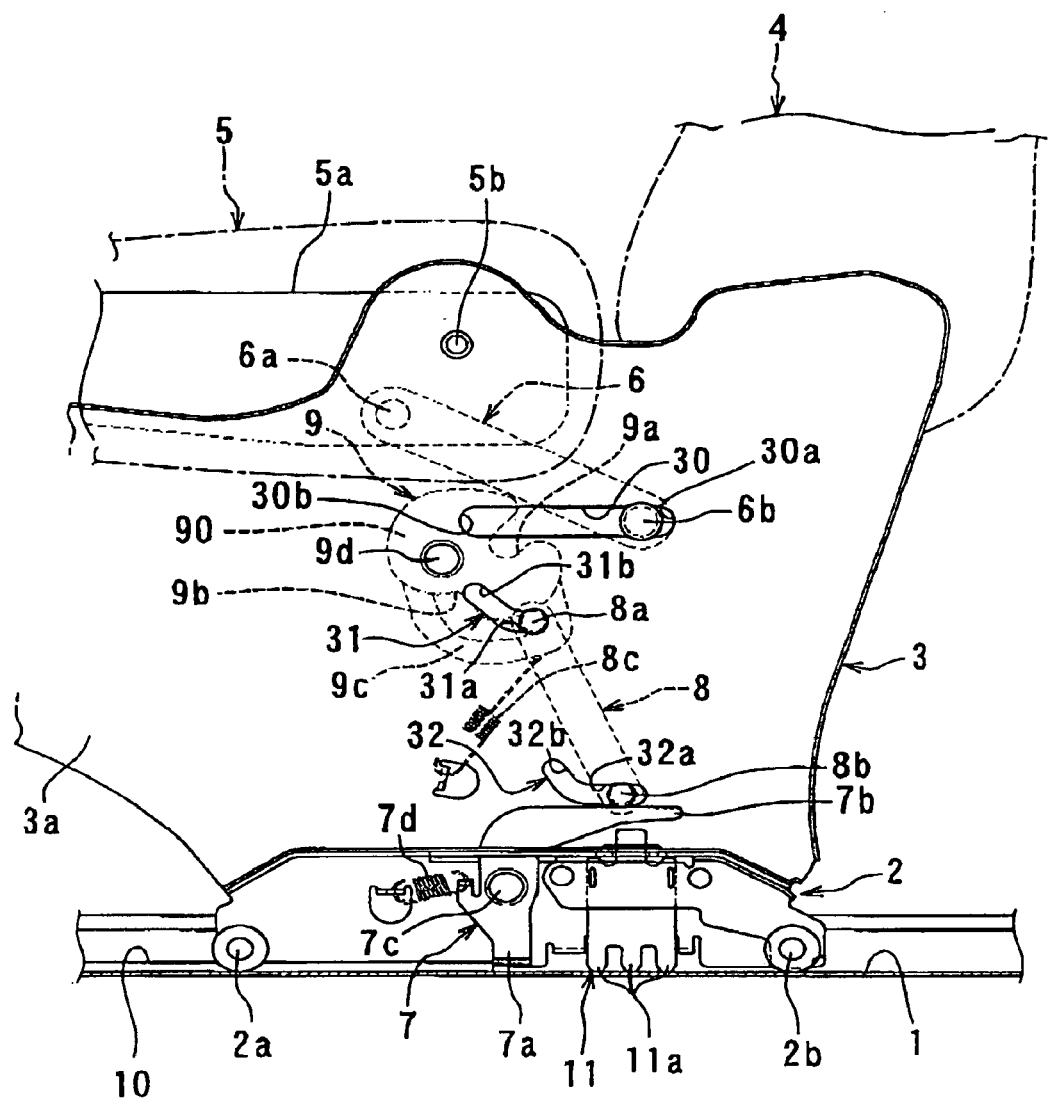
FIG. 2 is a schematic side view of the tip-up automotive seat of FIG. 1 being in a state where the seat can not be slid forward.
Figure 3:
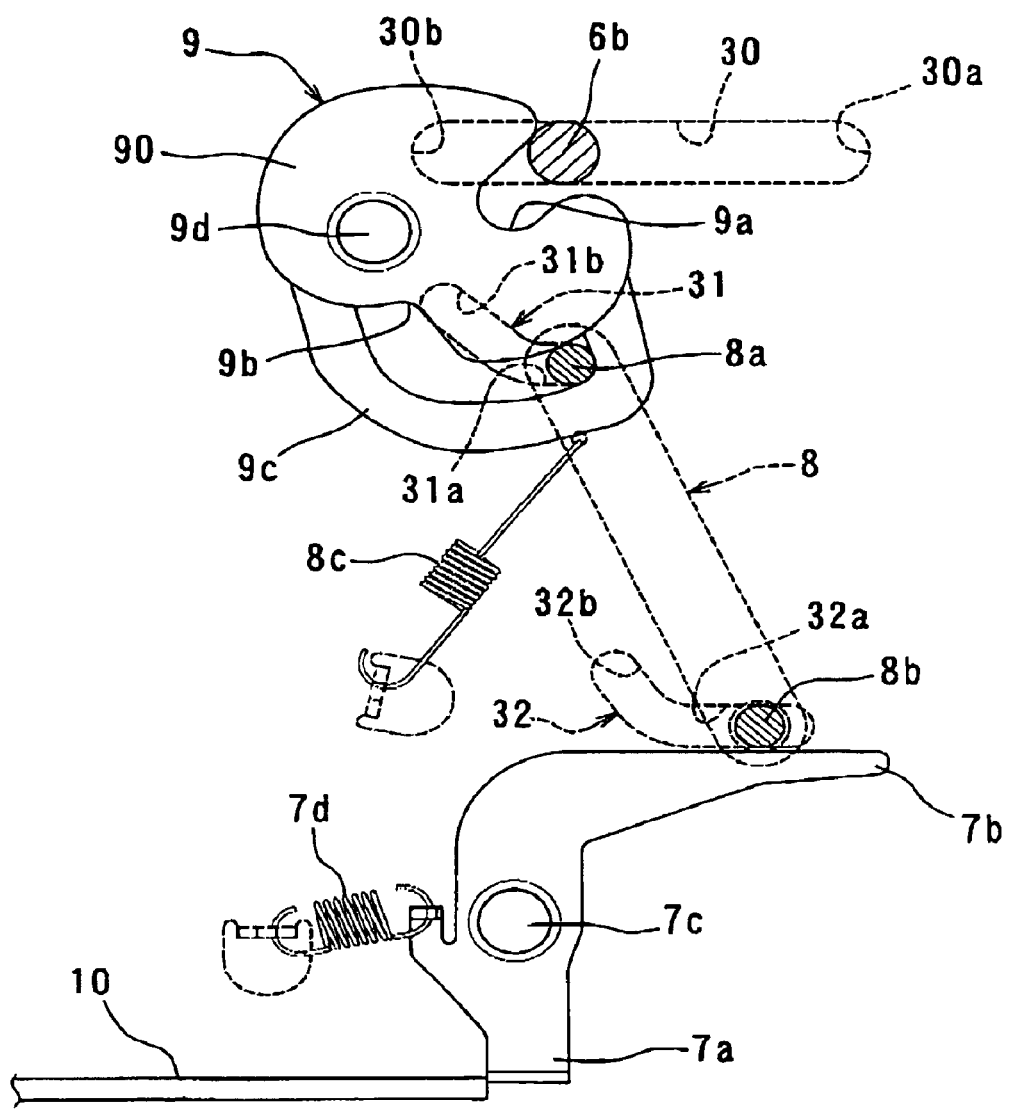
FIG. 3 is a schematic view of assistance in explaining the interlocking means in a condition where the seat can not be slid forward.

Referring to FIGS. 2 and 3, there is illustrated the rear seat in a state where the seat cushion 5 is not tipped up relative to the seat back 5. In this state, the second arm portion 7b of the restricting lever 7 is held by the stopper pin 8b of the operating rod 8 and the first arm portion 7a of the restricting lever 7 is abutted against the stopper plate 10. Therefore, even if the locking means 11 are operated by the operating lever and the engaging teeth 11a are disengaged from the engaging holes of the stationary rails 1, the rear seat can not be moved forward. This state will tell a passenger that the seat cushion 5 should be tipped up relative to the seat back 4 in such a manner that the first arm portion 7a of the restricting lever 7 is released from the stopper plate 10, prior to the moving of the rear seat toward the front seat.

Figure 4:
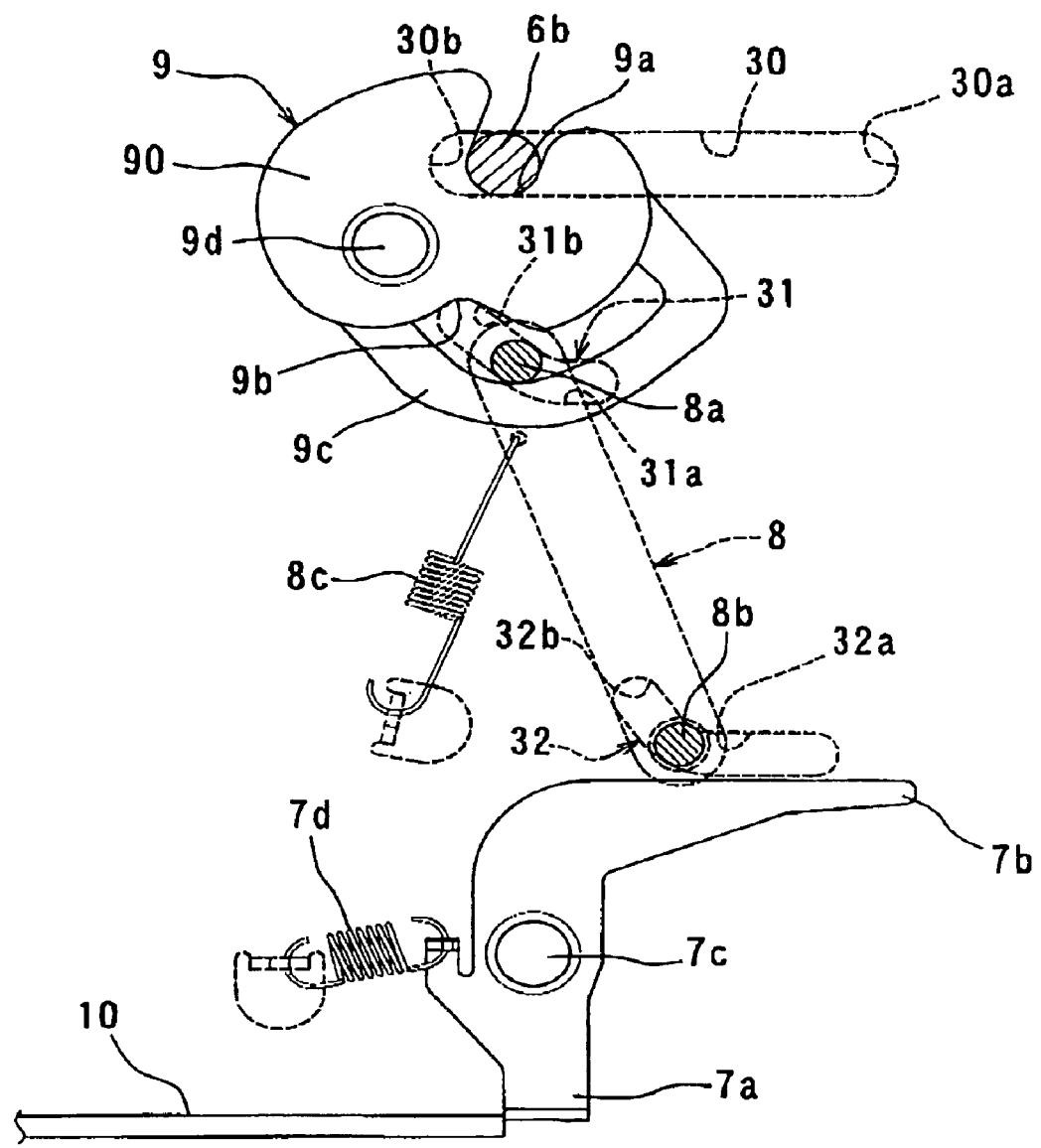
FIG. 4 is a schematic view of assistance in explaining the operation of the interlocking means.

When the seat cushion 5 is tipped up relative to the seat back 4, the rod 6 is pulled upward while causing the inducting pin 6b of the rod 6 to be moved toward the second end 30b of the elongated hole 30 along the elongated hole 30. During the movement of the inducting pin 6b of the rod 6, the inducting pin 6b of the rod 6 is operatively engaged with the upper receiving recess portion 9a of the cam body 90 as shown in FIG. 4, whereby the cam 9 is rotated around the support pin 9d in the counterclockwise direction. As the cam 9 is rotated, the semi-ring like guide member 9c of the cam 9 causes the support pin 8a of the operating rod 8 to be moved toward the second hole portion 31b of the upper guide hole 31, whereby the operating rod 8 is moved upward. The upward movement of the operating rod 8 causes the stopper pin 8b of the operating rod 8 to be moved toward the fourth hole portion 32b of the lower guide hole 32, whereby the restricting lever 7 is rotated by the action of the coil spring 7d so as to run onto the stopper plate 10. Thus, the rear seat is brought to a condition where it can be moved forward.

Figure 5:
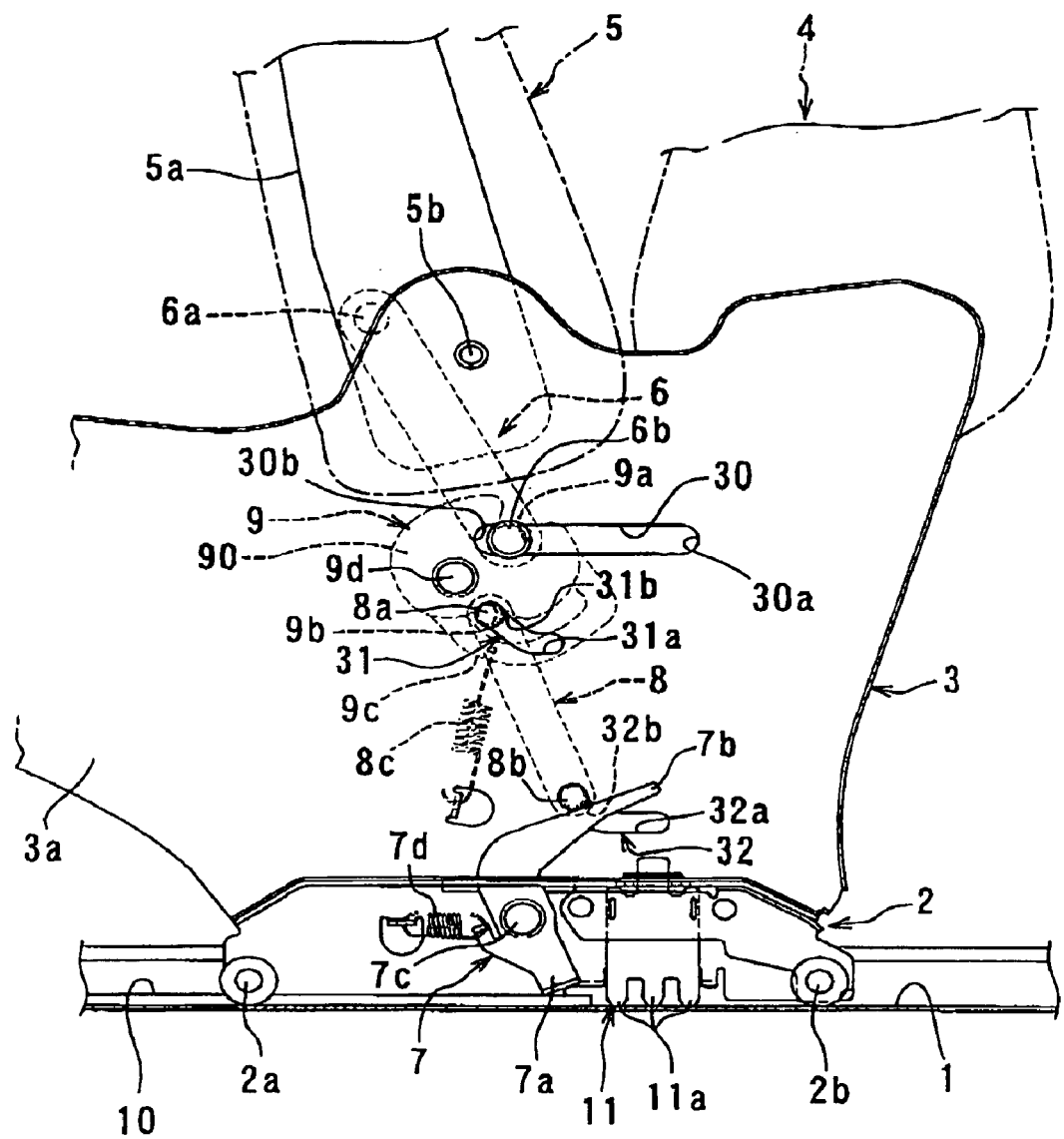
FIG. 5 is a schematic view of the seat in which a seat cushion of the seat is tipped up.
Figure 6:
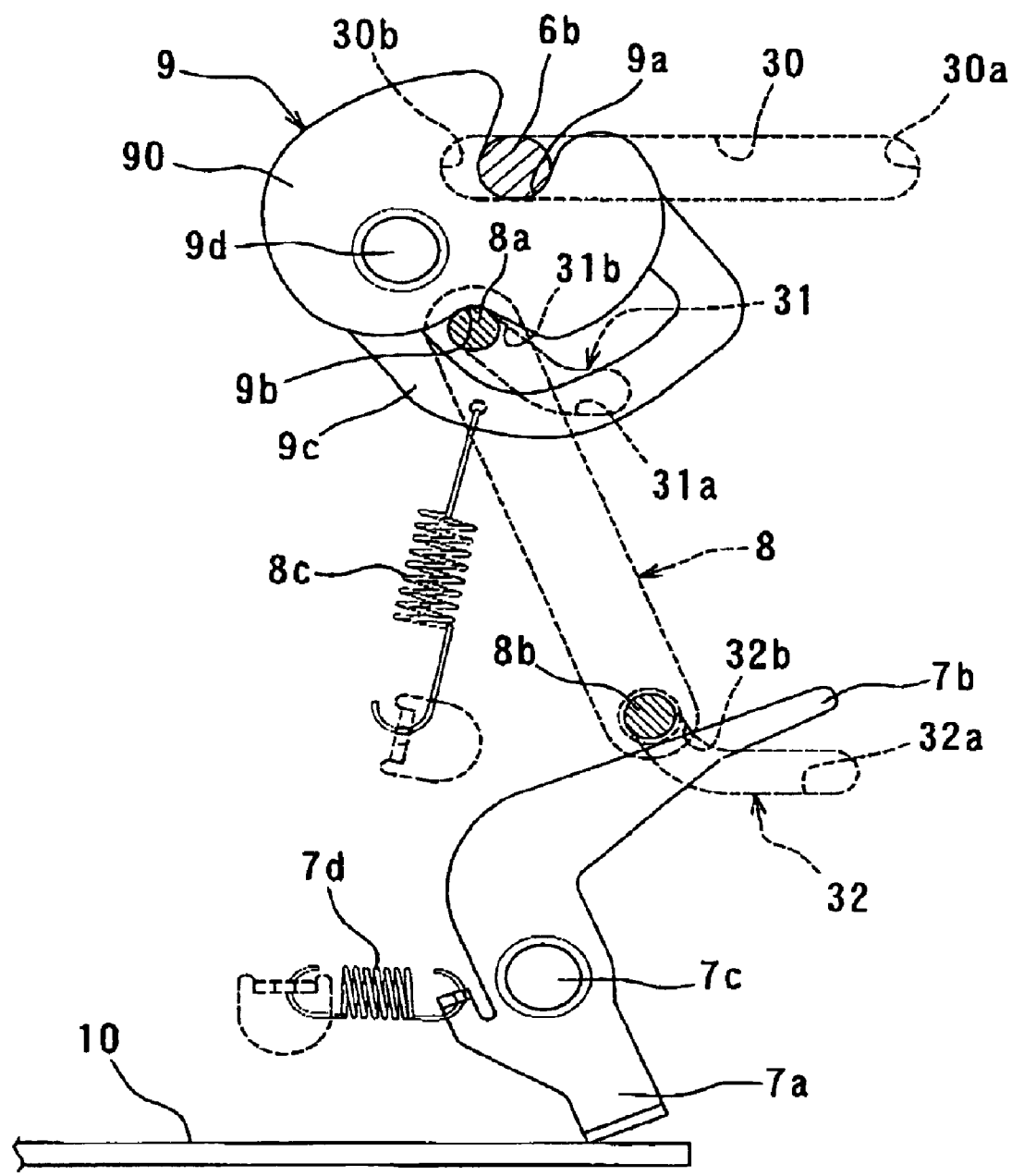
FIG. 6 is a schematic view of the interlocking means, the operation of which is completed.

When the seat cushion 5 is completely tipped up relative to the seat back 4, the stopper pin 8b of the operating rod 8 is pushed upward along the fourth hole portion 32b of the lower guide hole 32 by the restricting lever 7, whereby the operating rod 8 is moved upward and the support pin 8a of the operating rod 8 is operatively engaged with the lower receiving recess portion 9b of the cam 9 and supported by a lower edge portion of the fourth hole portion 32b of the lower guide hole 32 as shown in FIGS. 5 and 6. In this condition, a load of the seat cushion 4 having been tipped up is carried by the support pin 8a of the operating rod 8.

When the rear seat is moved rearward, unless the first arm portion 7a of the restricting lever 7 comes off the stopper plate 10, the seat cushion 5 can not be rotated so as to become horizontal relative to seat back 4 which is in a standing-up condition. When the first arm portion 7a of the restricting lever 7 is separated from the stopper plate 10 during the rearward movement of the rear seat, the restricting lever 7 is returned to its original posture by the action of the return spring 7d. Simultaneously, the support pin 8a of the operating rod 8 and the stopper pin 8b are moved along the upper guide hole 31 and the lower guide hole 32, respectively, whereby the operating rod 8 is brought to a state where it is allowed to be returned to its original position.

In a state where the operating rod 8 is brought to a state where it is allowed to be returned to its original position, when the seat cushion 5 is rotated so as to become horizontal, the rod 6 is swung while causing the inducting pin 6b of the rod 6 to be disengaged from the upper receiving recess portion 9a of the cam 9 and causing the indicating pin 6b to be moved toward the first end 30a of the elongated hole 30. During the disengagement of the indicating pin 6b from the upper receiving recess portion 9a of the cam 9, the cam 9 is rotated in the clockwise direction by the inducting pin 6b. When the cam 9 is rotated in a clockwise direction in FIGS. 5 and 6, the support pin 8a of the operating rod 8 is moved toward the first hole portion 31a of the upper guide hole 31, whereby the operating rod 8 is returned to its original position by the action of the return spring 8c while allowing the support pin 8a and the stopper pin 8b to be moved along the first hole portion 31a of the upper guide hole 31 and the third hole portion 32a of the lower guide hole 32. As a result, the stopper pin 8b is operatively abutted against the upper region of the second arm portion 7b of the restricting lever 7 so as to rotate the restricting lever 7 against the action of the spring 7c and the restricting lever 7 is brought to a condition where it is to be abutted against the stopper plate 10 as shown in FIGS. 1 and 2. Thus, the rear seat is brought to a condition where it can not be moved to the position immediately behind the front seat.

As discussed above, the interlocking mechanism includes the restricting lever 7 pivotally supported to the side of the movable rail 2 by the support pin 7c, the cam 9 having the cam body 90, the upper and lower receiving recess portions 9a, 9b formed in the cam body 90, and the semi-ring like guide member 9c, the operating rod 8 coupled between the side bracket 3 and the semi-ring like guide member 9c, and the stopper plate 10 mounted on the bottom surface of the stationary rail 1. The operating rod 8 is provided with the support pin 8a which is inserted in the upper guide hole 31 of the side bracket 3, and the engaging pin 8b which is inserted in the lower guide hole 32 of the side bracket 3. The restricting lever 7 is urged by the spring 7d. The operating rod 8 is urged by the spring 8c. Thus, the interlocking mechanism according to the present invention is simply constructed.

Furthermore, in a condition where the seat cushion 5 has been tipped up, the support pin 8a is received by the lower edge region of the second hole portion 31b of the upper guide hole 31, whereby the load of the seat cushion is carried by the support pin 8a, so that the interlocking mechanism according to the present invention can sufficiently resist the load of the seat cushion. Also, the rod 6, the restricting lever 7, the operating rod 8, and the cam 9 are arranged above the stationary rail 1 and the stopper plate 10 is arranged within the stationary rail 1, so that an additional space for arranging of those components is not required around the foot of the passenger.

In the illustrated embodiment, the restricting lever 7 is pivotally supported to the side of the movable rail 2 by the support pin 7c and the return spring 7d is stretched between the movable rail 2 and the first arm portion 7a of the restricting lever 7. However, the restricting lever 7 may be pivotally supported to the side bracket 3 by the support pin 7c and the return spring 7d may be stretched between the side bracket 3 and the first arm portion 7a of the restricting lever 7.

It will thus be seen that the objects set forth above, and those made apparent from the preceding description, and efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A tip-up automotive seat comprising:

a seat cushion;

a seat back;

seat track means for allowing said seat to be moved forward and rearward in a vehicle;

said seat track means including a pair of substantially parallel stationary rails attached to a floor section of said vehicle, and a pair of substantially parallel movable rails slidably supported to said stationary rails;

said movable rails having side brackets rising up therefrom;

said seat back being arranged between said side brackets and supported to said side brackets;

said seat cushion being arranged between said side brackets and pivotally supported to said side brackets;

tipping-up means provided at one side or both sides of said seat for allowing said seat cushion to be tipped up relative to said seat back;

said tipping-up means comprising a first rod and a straightly extending elongated hole formed in a corresponding side bracket;

said first rod having a first end portion and a second end portion;

said first end portion of said first rod being connected to a corresponding side of said seat cushion;

said second end portion of said first rod being provided with an inducting pin;

said inducting pin of said first rod being inserted in said straightly extending elongated hole so as to be moved along said elongated hole; and interlocking means provided at the one side or both sides of said seat for preventing said seat from being moved forward unless said seat cushion is tipped up relative to said seat back and for allowing said seat to be moved forward when said seat cushion is tipped up;

said interlocking means comprising:

a restricting lever of a substantially inverted L-shape pivotally supported to a side of a corresponding movable rail;

said restricting lever having a first arm portion extending toward a bottom portion of a corresponding stationary rail, and a second arm portion extending rearward from an upper region of said first arm portion;

first spring means stretched between the side of said movable rail and said restricting lever;

a second operating rod having a third end portion and a fourth end portion;

said second operating rod including a support pin provided at said third end portion thereof and a stopper pin provided at said fourth end portion thereof;

vertically spaced apart upper and lower guide holes of substantially L-shapes formed in said side bracket and disposed at portions of said side bracket which are lower than a portion of said side bracket in which said elongated hole is formed;

said upper guide hole having a first hole portion extending substantially horizontally, and a second hole portion extending obliquely and upward from said second hole portion;

said lower guide hole having a third hole portion extending substantially horizontally along an upper region of said second arm portion of said restricting lever, and a fourth hole portion extending obliquely and upward from said third hole portion;

said support pin of said second operating rod being inserted in said upper guide hole so as to be moved along said upper guide hole;

said stopper pin of said second operating rod being inserted in said lower guide hole so as to be moved along said lower guide hole;

second spring means stretched between said side bracket and said operating rod;

cam means disposed substantially between said elongated hole and said upper guide hole and pivotally supported to said side bracket;

said cam means comprising a cam body, an upper receiving recess portion formed in said cam body for receiving said inducting pin of said first rod, and a lower receiving recess portion formed in said cam body for receiving said support pin of said second operating rod; and a stopper plate mounted on said bottom portion of said stationary rail, wherein unless said seat cushion is tipped up, said stopper pin of the second operating rod holds said second arm portion of said restricting lever and said first arm portion of said restricting lever is to be abutted against said stopper plate, so that said seat can not be moved forward, and wherein when said seat cushion is tipped up, said first rod is pulled upward while allowing said inducting pin of said first rod to be moved along said elongated hole, said inducting pin is operatively engaged with said upper receiving recess portion of said cam while causing said cam to be rotated, said second operating rod is moved upward while allowing said support pin and said stopper pin to be moved along said upper guide hole and said lower guide hole, respectively, whereby said restricting lever is allowed to be rotated due to an action of said first spring means and said restricting lever is brought to a condition where it is not to be abutted against said stopper plate.

2. A tip-up automotive seat as set forth in claim 1, wherein said cam means further includes a semi-ring like guide member for guiding said support pin of said second operating rod along said upper guide hole, said semi-ring like guide member hanging downward from said cam body, said support pin of said second operating rod passing a space surrounded by said cam body and said semi-ring like guide member and being inserted in said upper guide hole.

* * * * *